(12) United States Patent
Wilsher

(10) Patent No.: US 9,798,894 B2
(45) Date of Patent: Oct. 24, 2017

(54) SECURE COMPUTER DISPLAY USING INVERSE COMPUTATIONAL LIGHT FIELD DISPLAYS

(71) Applicant: Xerox Corporation, Norwalk, CT (US)

(72) Inventor: Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 56 days.

(21) Appl. No.: 14/790,261

(22) Filed: Jul. 2, 2015

(65) Prior Publication Data

US 2017/0004326 A1 Jan. 5, 2017

(51) Int. Cl.
| | | |
|---|---|---|
| G06F 21/62 | (2013.01) | |
| G06F 3/14 | (2006.01) | |
| G02B 27/22 | (2006.01) | |
| G06F 21/60 | (2013.01) | |
| G06F 21/84 | (2013.01) | |

(52) U.S. Cl.
CPC ..... *G06F 21/6245* (2013.01); *G02B 27/2214* (2013.01); *G06F 3/14* (2013.01); *G06F 21/604* (2013.01); *G06F 21/84* (2013.01)

(58) Field of Classification Search
CPC .. G06F 21/6245; G02B 27/0179; G02B 27/22
USPC .......................................................... 726/28
See application file for complete search history.

(56) References Cited

U.S. PATENT DOCUMENTS

| | | | | |
|---|---|---|---|---|
| 2010/0271467 A1* | 10/2010 | Akeley | .............. | H04N 13/0406 348/59 |
| 2012/0140131 A1* | 6/2012 | Lanman | .............. | G02B 27/2214 349/15 |
| 2014/0168034 A1* | 6/2014 | Luebke | ................ | G02B 27/017 345/8 |
| 2015/0049390 A1* | 2/2015 | Lanman | .............. | G02B 27/0075 359/622 |
| 2016/0042501 A1* | 2/2016 | Huang | .................... | G06T 5/003 345/428 |
| 2016/0180503 A1* | 6/2016 | Frascati | ................ | G06T 3/0093 345/646 |
| 2016/0216515 A1* | 7/2016 | Bouchier | ............. | G03H 1/0808 |
| 2016/0252758 A1* | 9/2016 | Lee | ..................... | G02B 27/0101 |
| 2017/0091490 A1* | 3/2017 | Cameron | ................ | G06F 21/84 |

OTHER PUBLICATIONS

Fu-Chung Huang et al., "Correcting for Optical Aberrations using Multilayer Displays", ACM Transactions on Graphics (TOG)—Proceedings of ACM SIGGRAPH Asia 2012, vol. 31, Issue 6, Nov. 2012, Article No. 185.
Fu-Chung Huang et al., "Eyeglasses-free Display: Towards Correcting Visual Aberrations with Computational Light Field Displays", ACM Transactions on Graphics (TOG)—Proceedings of ACM SIGGRAPH 2014, vol. 33, Issue 4, Jul. 2014, Article No. 59.

* cited by examiner

Primary Examiner — Izunna Okeke
Assistant Examiner — Hee Song
(74) Attorney, Agent, or Firm — Fox Rothschild LLP

(57) ABSTRACT

A system and method to secure information displayed on the screen of a computing device is provided in which an image to be displayed is algorithmically distorted and thereafter displayed on a display device. To properly view the image, a user must use decoding eyewear which will correct for the applied distortion. The displayed image is thereby rendered unviewable to casual observers and passers-by.

11 Claims, 4 Drawing Sheets

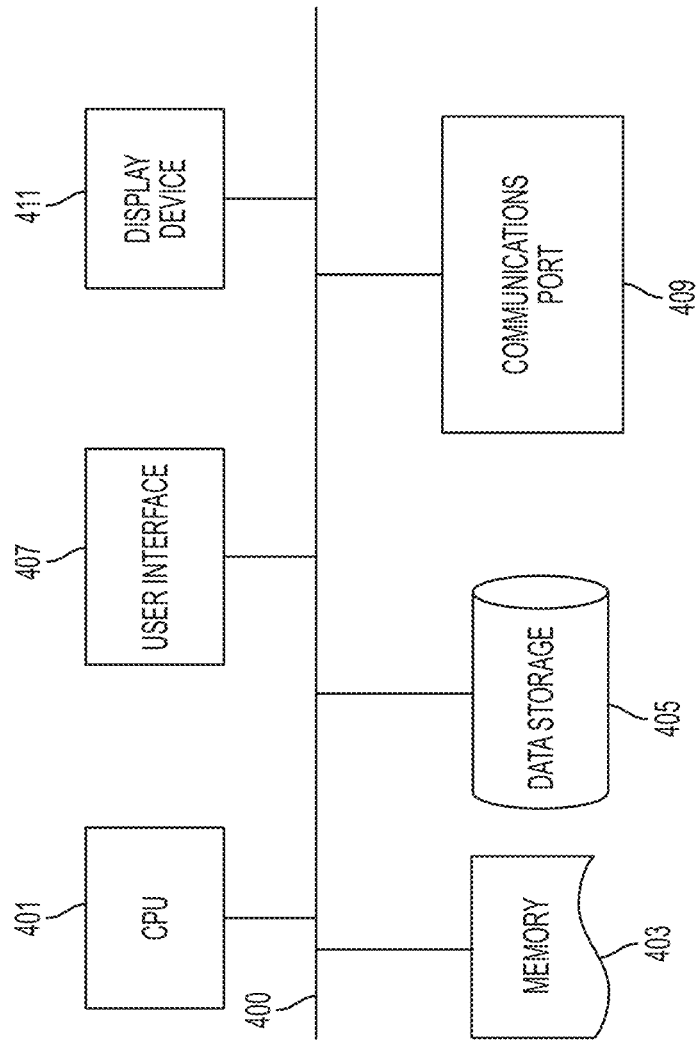

SECURE COMPUTER DISPLAY USING INVERSE COMPUTATIONAL LIGHT FIELD DISPLAYS

BACKGROUND

This patent document relates to the field of computer security, and, in particular, to the physical security of information presented on a computer display.

Data stored on and used by computer applications is often sensitive or confidential in nature. Sensitive information, such as corporate intelligence, financial data, health data and classified information are all commonly stored on and manipulated by computers. While it is widely recognized that such data must be kept secure from hackers who may attempt to access it via a computer network, it is less widely realized that such data must also be secure from casual or accidental disclosure when it is being displayed on a computer screen.

Consider the case of a computer in a doctor's office displaying individual medical data which must be secured under the HIPAA regulations. Such data may be open to casual disclosure to other patients walking through the office. It is well known that the likelihood of disclosure of sensitive data from casual viewing of a computer screen may be reduced by the use of a privacy filter, which reduces the angle from which a computer screen may be viewed, such that the screen may only be view from a head-on angle. In addition, it is also well known to use automatic screen savers, which typically black the screen or replace the data on the screen with an alternative graphic when the computer has not been used for a period of time. The screen saver, however, still does not prevent the viewing of data when there is an active user.

It would therefore be desirable to provide a way to limit the ability to view data on a computer display to a particular, authorized individual, regardless of whether or not the display is visible to casual passers-by.

SUMMARY

The document describes a system that addresses the need to prevent casual, unauthorized viewing of sensitive data by applying a distortion to a light field emitted by the display which renders the display unreadable. The data on the screen may be read only when a special pair of eyewear is used which corrects for the particular applied distortion. Therefore, the screen is rendered unreadable by anyone save for the person with the proper corrective eyewear. The system may apply different distortions such that the eyewear meant to make one screen readable will not work with other screens.

Thus, in an embodiment, a system for displaying output of a computer system includes a processor, a display device, and a computer-readable medium containing programming instructions. When the system receives an image to be displayed on the display device, it will identify one or more parameters for a set of decoding eyewear, and it will use the one or more parameters to generate a light field. The light field will cause the image to appear in a distorted and unreadable state to a user having aberration-free vision or normally corrected vision, and in an undistorted and readable state to a user who is using the decoding eyewear. The system will then cause the display device to use the light field and the received image to display the distorted image.

To identify one or more parameters for the set of decoding eyewear, the system may receive an identification of the set of decoding eyewear via a user interface. It may then access a data storage facility and retrieve the set of parameters for the set of decoding eyewear, or it may retrieve a light field generating rule set that contains the set of parameters for the set of decoding eyewear.

Optionally, the display device may be a light field display that includes a 2D display device having a first plane, along with a parallax barrier, mounted on the 2D display and providing a second plane over the first plane. The parallax barrier may include a mask having an array of pinholes defined therein, and a spacer that separates the mask from the 2D display.

BRIEF DESCRIPTIONS OF THE DRAWINGS

FIG. 4 illustrates example elements of a computing device that may be used with the disclosed embodiments.

DETAILED DESCRIPTION

Figure 1A:
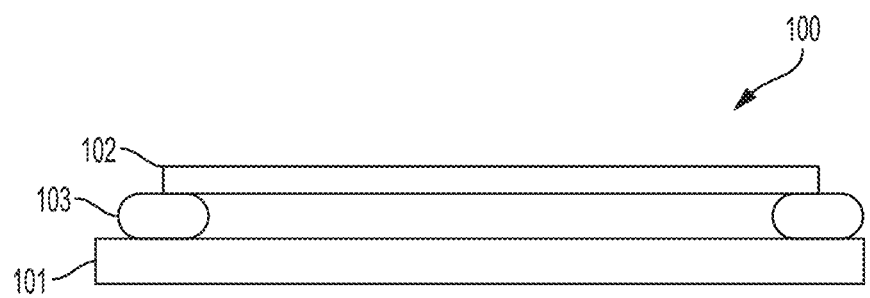
FIG. 1A shows a side view of an example of a light field display device.

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computer" or "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

The terms "memory" and "computer-readable medium" each refer to a non-transitory device on which computer-readable data, programming instructions or both are stored. Unless the context specifically states that a single device is required or that multiple devices are required, the terms "memory" and "computer-readable medium" include both the singular and plural embodiments, as well as portions of such devices such as memory sectors.

A "processor" or "processing device" is a component of an electronic device that executes programming instructions. These terms may refer to either a single processor or to multiple processors that together implement various steps of a process. Unless the context specifically states that a single processor is required or that multiple processors are required, the terms "processor" and "processing device" include both the singular and plural embodiments.

A "light field" is defined as a 4D function showing radiance as a function of position and direction in portions of space, and which represents the flow of light through an empty region of three-dimensional space.

A "light field display" is a display device capable of displaying a light field. For purposes of this document, a light field display will include two parallel planes wherein the position of a ray of light emitted from a first of the two planes may strike the second plane at a different point, thereby shifting the position of the pixels from the point of view of a user looking at the second plane. Other implementations, such as micro lenses forming the 4D display, are also possible.

In this document, the term "eyewear" means a device containing one or more corrective lenses, which is designed to be worn by a user over the eyes or positioned by the user near the eyes. Examples of eyewear include wearable items such as eyeglasses, contact lenses, googles, and other headgear containing lenses that are positioned over the eyes. Other examples include optical instruments that are configured to that, when used, the instruments are positioned close enough to the user's eyes so that the instrument's lens(es) provide the user with an optical correction function. Examples of such optical instruments include non-wearable devices such as binoculars, field glasses, telescopes, hand-held magnifiers, a heads-up display in a vehicle that includes corrective lenses, and the like.

In the prior art, and in particular in the field of vision correction, it is known that images may be presented in a format that adjusts an image so that it a person with myopia may view the image without the need for eyewear. An example if this is detailed in a paper entitled "Eyeglasses-Free Display: Towards Correcting Visual Aberrations With Computational Light Field Displays", Huang, et al. [SIGGRAPH 2014, ACM Transactions on Graphics 33(4)]. In the paper, Huang, et al. proposed presenting a four dimensional (4D) light field to an observer such that a desired two dimensional (2D) retinal projection is perceived. The emitted light field can be derived algorithmically, based at least on the users' pupil size, distance from the display and required eyeglass prescription, to emit a light field that allows the user to perceive a corrected visual field without the use of the required eyewear.

The system proposed by Huang, et al. may serve as background for the embodiments described below, which processes and displays an image in distorted form so that its details are essentially unreadable to a viewer with aberration-free vision (or normally corrected vision). However, when a viewer uses a set of eyewear having known optical parameters, the viewer will see the image in its undistorted form. When this document uses the term "aberration free vision" or "normally corrected vision," it means 20/20 (or better) visual acuity, along with minor deviations from 20/20 visual acuity in which the person still may discern images without requiring corrective lenses for day-to-day activities. Optionally, normal vision may include visual acuity up to a maximum of 20/40.

The display device may be a conventional display device, a light field display device, or another type of display. Optionally, as shown in FIG. 1A, various embodiments herein may use a light field display 100 that includes a regular 2D display device 101 with an added parallax barrier 102. The regular display device provides the first plane of the light field display, and the parallax barrier provides the second plane of the light field display. A parallax barrier is a barrier mask having pinholes placed therein. In some embodiments, the pinholes may have a density of 5080 dots per inch, and the pinholes may be 75 microns in diameter and be spaced 390 microns apart. The mask is mounted on but spaced away from the 2D display, such as by using an optionally-transparent spacer 103 which is 5.4 mm thick (or another known thickness) and made of acrylic or other material. The resulting display emits a light field with a high-enough angular resolution such that at least two views may enter the pupils of a human observer. Other pinhole densities, sizing, and spacing may be used, along with different spacings between the two planes. The algorithms discussed below presume a light field display configuration with these parameters; appropriate adjustments may be implemented for other light field display configurations.

Figure 1B:
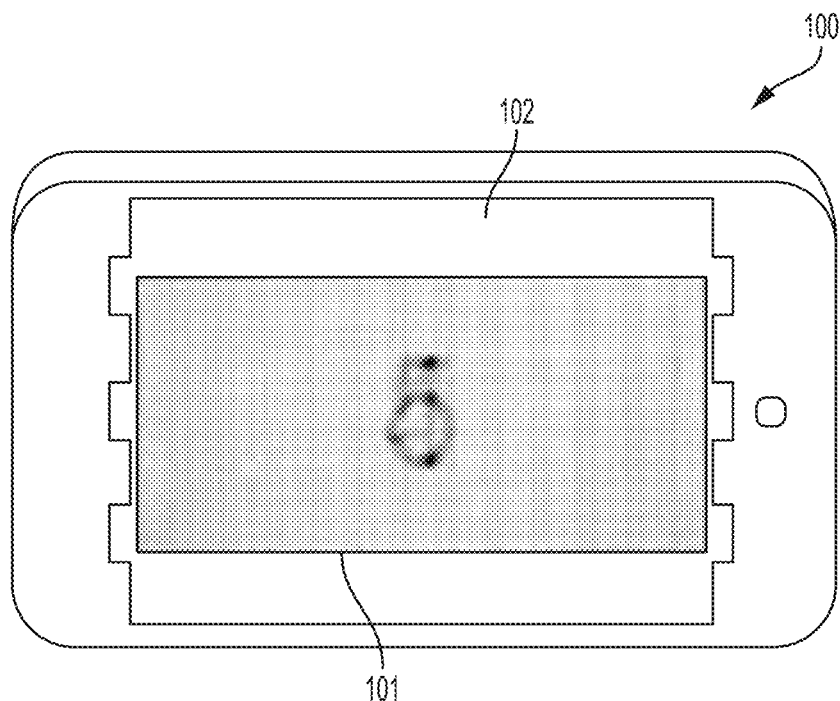
FIG. 1B shows a front view with content of the display visible.

FIG. 1B is a front facing view of the light field device 100 with the parallax barrier mounted on and offset from the display 101 of a computing device that is a mobile phone. In FIG. 1B, the display 101 is multiple Arabic numerals emitted in different viewing directions. Thus, when viewed without corrective eyewear a normal viewer's finite pupil size will create an average of multiple different views on the retina, thus causing the images to appear distorted.

Figure 2:
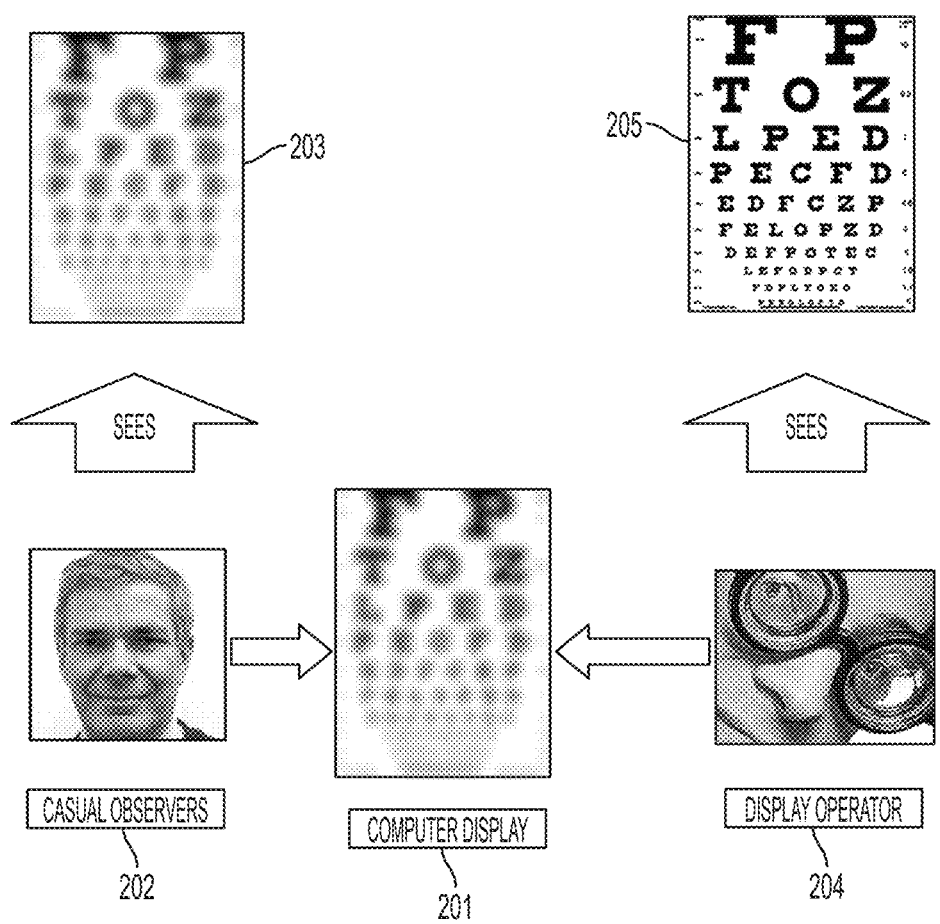
FIG. 2 shows a high-level concept of the embodiments described in this document in graphic form.

In the present embodiments, with reference to FIG. 2, a processor implementing programming instructions will cause a distorted image 201 to be displayed by the display device (such as the light field display described above). The display device will then display the image 201 to provide a distorted view of the content to a person 202 with aberration-free vision or with normally corrected vision (i.e., corrected by the proper eyewear for the person). Thus, to the casual observer, the screen appears distorted 203, as if viewed by a person not wearing the proper corrective eyewear.

To properly view the content displayed on the display device, the user will be required to use special "decoding" eyewear 204. Decoding eyewear is a set of eyewear with optically corrective lenses having parameters known to the system such that the eyewear, when used by a user having aberration-free or normally corrected vision, will un-do the distortion that appears on the display and see the content in undistorted form 205, thus allowing normal viewing of the content on the display.

The system may be programmed to receive an image to be displayed, and to apply a pre-set distortion or a distortion to a light field generated by the display that is appropriate for one or more parameters of the specific decoding eyewear being used. The user may be required to identify, via a user interface, decoding eyewear being used or one or more parameters of the decoding eyewear, such that the display may be distorted in the proper manner. The identification may be in the form of a typical eyewear prescription, or may be any other type of identification, for example, a serial number. The system may include or have access to a data storage facility that stores one or more distortion rule sets that will generate a light field that will distort the image in a way that it can be perceived with the decoding eyewear. The system may store various parameters for various known eyewear types, so that when the system receives an eyewear identification it will retrieve the eyewear's parameters from the data storage facility and process the image using a common rule set and the retrieved parameters.

Alternatively, the system may store various rule sets in association with various eyewear such that when the system receives an eyewear identification the system will retrieve the appropriate image processing rule set for the eyewear from the data storage facility and this automatically apply the appropriate parameters for the identified eyewear. In another embodiment, a user may have multiple variations of decoding eyewear available to use. If so, the system may have pre-distorted an image and saved the distorted image to the data storage facility in association with an identifier for the image's corresponding decoding eyewear. Then, when a user initiates a system action that will case the system to display the image, the system may determine whether the user has presented an appropriate authentication credential, and if so it will output the identification of the appropriate decoding eyewear so that the user will know what eyewear to use to view the image.

The rule set may rely on eyewear parameters such as optical power (measured in diopters or D) and/or focal length of the spherical component and/or optical component of each lens, an indication of the degree (if any) to which the optical axis is shifted from the spherical axis, or other parameters. The rule set also may incorporate or rely on a set of stored parameters for the display device and/or the parallax barrier. Example parameters for the display device may include typical viewing distance (i.e., typical distance between the user and the display), display size, pixel size, and/or pixel density. Example parameters of the parallax barrier are discussed above (e.g., pinhole size, distance between pinholes, and spacer distance.

Figure 3:
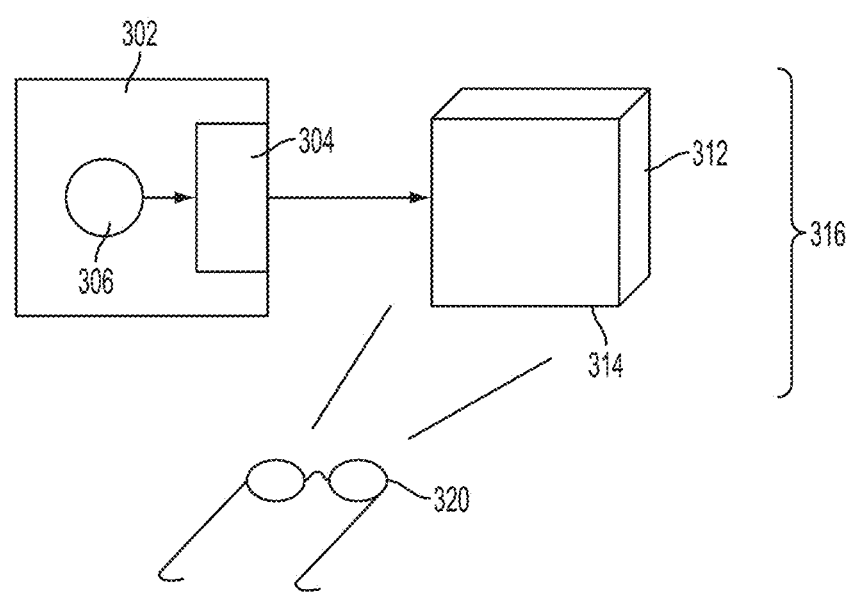
FIG. 3 shows various elements of a secure image presentation in schematic form.

The rule set may implement any appropriate algorithms for generating the light field that will distort the image. The algorithms may incorporate the parameters described above and/or receive any other parameters. For example, the system may apply the algorithms disclosed in the Huang et al. paper, discussed above. Other image processing algorithms may be used. The system may generate a light field that results in a desired 2D projection on the retina of an observer. The projection will present the image in a distorted state when the observer does not use the decoding eyewear, and in an undistorted state when the observer wears the decoding eyewear. For example, the system may apply a linear forward model:

$$i = Pl^d$$

where the matrix $P \in \mathbb{R}^{N \times N}$ represents a projection of the discrete, vectorised 4D light field $i \in \mathbb{R}^N$ emitted by the display onto the retina $l^d \in \mathbb{R}^N$. Using a typical viewing distance for the display device, pupil size, and other parameters associated with an observer who is wearing or otherwise using the decoding eyewear, the light field can be found by optimizing the following objective function (where i is the target image):

minimize $\|i - Pl^d\|_2$
$\{l^d\}$
subject to $0 < l^d_i \leq 1$, for $i = 1 \ldots N$ FIG. 3 shows an example of the system disclosed above in schematic form. A standard display screen 312 is, in one embodiment, fitted with parallax barrier 314 to create light field display 316. Computing device 302 drives display 316. Display driver 304 is augmented by the light field generation algorithm 306, which applies to proper distortion to properly view the light field display 316, the user must wear or otherwise decoding eyewear 320 near the user's eyes. Without decoding eyewear 320, the image displayed on light field display 316 appears distorted and, therefore, unreadable to the casual observer. This helps provide security in that an ordinary observer cannot view the document—only a person who has the proper decoding eyewear can view it. It should be understood by one of skill in the art that the instruction set 302 that implements the content distortion algorithm may be integral with, a replacement for, or provided in addition to display driver 304.

FIG. 4 depicts a block diagram of hardware and/or electronics that may make up a system that presents and/or distorts the content as described above. One or more communications lines 400 such as a bus (for a single device) or network (for multiple devices) may interconnect the illustrated components and allow data and/or signals to flow between the components. CPU 401 represents one or more processors that will perform calculations and logic operations required to execute a program. Any number of processors may be available, and they may be part of a single electronic device or distributed across any number of networked electronic devices. The processor(s) may access a computer-readable memory device 403 containing programming instructions, along with a data storage facility 405 such as a database that stores the package generation templates and/or rule sets. The processor(s) also may receive instructions and/or data from one or more external sources via a communications port 409.

A user interface 407 is a device or system that provides output to, and receives input from, a user. The user interface 407 may include a touch-sensitive component, microphone, audio port, keyboard, mouse, touch pad, or other input mechanism that is capable of receiving user input. The system also will include one or more display devices 411, each of is capable of outputting images based on data processed by the processor(s). The user interface 407 and display 411 may be separate from each other and/or integral with each other, such as would be the case for a touch-sensitive display.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for displaying output of a computer system comprising:
   a processor;
   a set of decoding eyewear that comprises a wearable item having one or more corrective lenses that provide an optical correction function;
   a light field display device;
   a computer-readable medium containing programming instructions that are configured to cause the processor to:
   receive an image to be displayed on the light field display device,
   identify one or more parameters for the set of decoding eyewear by:
      receiving, via a user interface, an identification of the set of decoding eyewear; and
      accessing a data storage facility and retrieving the one or more parameters for the set of decoding eyewear, or retrieving a rule set that contains the one or more parameters for the set of decoding eyewear;
   use the one or more parameters to generate a light field that yields a distorted image such that the distorted image will appear, when displayed on the light field display device:
      in a distorted and unreadable state to a user having aberration-free vision or normally corrected vision; and
      in an undistorted and readable state to a user who is using the set of decoding eyewear; and
   cause the light field display device to output the light field and received image to yield the distorted image.

2. The system of claim 1 wherein the light field display device comprises:
   a 2D display device having a first plane; and
   a parallax barrier, mounted on the 2D display and providing a second plane over the first plane.

3. The system of claim 2 wherein the parallax barrier comprises:
   a mask having an array of pinholes defined therein; and
   a spacer that separates the mask from the 2D display.

4. The system of claim 3 wherein the pinholes are approximately 75 microns in diameter and are regularly spaced approximately 390 microns apart.

5. The system of claim 3 wherein said spacer is acrylic.

6. A method of providing a secure display comprising:
   by a processing device:
      receiving an image to be displayed;
      identifying one or more parameters for a set of decoding eyewear, wherein the set of decoding eyewear comprises a wearable item having one or more corrective lenses that provide an optical correction function, and wherein identifying the one or more parameters comprises:
         receiving, via a user interface, an identification of the set of decoding eyewear; and
         accessing a data storage facility and retrieving the one or more parameters for the set of decoding eyewear, or retrieving a rule set that contains the one or more parameters for the set of decoding eyewear;
      using the one or more parameters to generate a light field that will yield a distorted image such that the distorted image will appear:
         in a distorted and unreadable state to a user having aberration-free vision or normally corrected vision, and
         in an undistorted and readable state to a user who is using the set of decoding eyewear; and
   by a light field display device, using the light field to display the distorted image.

7. The method of claim 6 wherein the light field display device comprises:
   a 2D display device having a first plane; and
   a parallax barrier, mounted on the 2D display device and providing a second plane over the first plane.

8. The method of claim 7 wherein the parallax barrier comprises:
   a mask having an array of pinholes defined therein; and
   a spacer that separates the mask from the 2D display device.

9. The method of claim 8 wherein the pinholes are approximately 75 microns in diameter and are regularly spaced approximately 390 microns apart.

10. The method of claim 8 wherein the spacer is acrylic.

11. The method of claim 6, further comprising:
   identifying one or more parameters of the light field display device; and
   when generating the light field, also using the one or more parameters to of the light field display device.

* * * * *